(12) United States Patent
Soutar et al.

(10) Patent No.: US 7,306,315 B2
(45) Date of Patent: Dec. 11, 2007

(54) UV CURABLE COATING COMPOSITION

(75) Inventors: Andrew McIntosh Soutar, Singapore (SG); Min Qian, Singapore (SG); Kok Mun Hew, Singapore (SG); Ivan Thomas Pereira, Singapore (SG); Guangjin Li, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 11/562,938

(22) Filed: Nov. 22, 2006

(65) Prior Publication Data

US 2007/0087206 A1    Apr. 19, 2007

Related U.S. Application Data

(62) Division of application No. 10/837,481, filed on Apr. 29, 2004, now Pat. No. 7,183,353.

(51) Int. Cl.
*B41J 2/01* (2006.01)
*B41J 2/135* (2006.01)
*C08J 7/04* (2006.01)
*C08J 7/16* (2006.01)

(52) U.S. Cl. ............... 347/20; 347/40; 347/44; 427/508; 427/510; 427/512; 427/515

(58) Field of Classification Search ........... 347/20, 347/40, 44; 427/508, 510, 512, 515
See application file for complete search history.

(56) References Cited

U.S. PATENT DOCUMENTS

| | | | | |
|---|---|---|---|---|
| 5,180,757 A * | 1/1993 | Lucey | ............... | 522/76 |
| 5,378,735 A * | 1/1995 | Hosokawa et al. | ........... | 522/79 |
| 5,426,131 A * | 6/1995 | Katsamberis | ........... | 522/16 |
| 5,449,702 A * | 9/1995 | Tayama et al. | ........... | 522/4 |
| 5,695,851 A * | 12/1997 | Watanabe et al. | ........... | 428/147 |
| 5,712,325 A * | 1/1998 | Lewis et al. | ........... | 522/83 |
| 5,907,333 A * | 5/1999 | Patil et al. | ........... | 347/20 |
| 5,910,372 A * | 6/1999 | Griffin et al. | ........... | 428/429 |
| 6,193,359 B1 * | 2/2001 | Patil et al. | ........... | 347/65 |
| 6,283,578 B1 * | 9/2001 | Popall et al. | ........... | 347/45 |
| 6,306,502 B1 * | 10/2001 | Fukushima et al. | ........... | 428/412 |
| 6,312,085 B1 * | 11/2001 | Kappel et al. | ........... | 347/20 |
| 6,825,239 B2 * | 11/2004 | Wilhelm et al. | ........... | 522/83 |

FOREIGN PATENT DOCUMENTS

EP    0 479 493    *   4/1992
EP    0 687 713 A1 * 12/1995

* cited by examiner

*Primary Examiner*—Susan Berman

(57) ABSTRACT

Disclosed is a method of coating an inkjet print head using a UV curable coating composition containing a (methyl) acryloxy or vinyl functionalized silane, silica and acrylate oligomer containing at least two acrylate groups.

13 Claims, 4 Drawing Sheets

UV CURABLE COATING COMPOSITION

CROSS-REFERENCE TO RELATED APPLICATIONS

This application is a divisional of application Ser. No. 10/837,481, filed Apr. 29, 2004, now U.S. Pat. No. 7,183,353 hereby incorporated by reference.

The present invention relates to a UV curable coating composition, a method for coating a substrate with said curable coating composition, and a substrate comprising a layer obtained by curing of said UV curable composition.

BACKGROUND

Electronic circuitry in the region of the interconnection between a die and a flexible circuit on print head assemblies is prone to corrosion. The rate of corrosion is accelerated by the presence of ink, which accumulates in this region following the wiping of the nozzle plate to ensure good print quality. The interconnect region on print heads is commonly protected by the application of a polymeric protective layer, which is also known as encapsulant layer (see, US Patent Application 2003/0017341 or U.S. Pat. No. 6,439,698). While these materials show good resistance to ink permeation, with inks becoming increasingly corrosive, problems are experienced with penetration of ink at the encapsulant/print head interface, which can lead to device failure.

Inorganic materials such as silica, alumina and tantala are known to produce efficient protective layers. However, these materials cannot be selectively deposited onto the interconnect region at this stage (connection of the print head to the flexible circuit) of the print head assembly process.

For other parts of ink jet print heads, the use of layers comprising cured polymer material is known. The use of photoimageable layers containing epoxy functional and methacryloxy functional silanes to produce channel structures, jet plates, reservoirs, ink filters and passivation layers of a print head is disclosed in U.S. Pat. No. 6,312,085. Similar materials are also used in U.S. Pat. No. 6,283,578 for the preparation of hydrophobic coating layers to control the wetting of ink on the surface of ink jet nozzle plates). The coating materials described in U.S. Pat. Nos. 6,283,578 and 6,312,085 require a long thermal curing step at elevated temperature in order to effectively cross-link the silanol groups which are present in the materials after curing by ultraviolet (UV) light. This long processing time renders these materials unsuitable for applications in which automated manufacturing processes, such as reel-to-reel processing, are employed that do not allow extended waiting times.

Furthermore, U.S. Pat. No. 5,910,372 discloses the use of a formulation based on a mixture of silanes with different functional groups for the preparation of hydrophobic coating layers on ink jet nozzle plates. Silanes containing amino groups are incorporated to improve adhesion to the nozzle plate, which is made of polyimide, while perfluoroalkyl substituted silanes are included to provide the required level of hydrophobicity. This patent advances an earlier technology described in U.S. Pat. No. 5,121,134 in which the materials were applied separately in two coating steps. These materials also require a long thermal curing step at elevated temperature which makes them unsuitable for use in manufacturing processes such as reel-to-reel processing.

Problems are experienced with ink penetration to the interconnection region being enabled by delamination of the protective layer from the various surfaces present on the print head. Delamination allows ink a ready path to the interconnect region by diffusion at the interface between the protective layer and the print head. These problems are becoming more difficult to overcome as ink formulations become more aggressive, while at the same time increased levels of product reliability are expected.

Accordingly, there remains the need for a coating material that shows low ink uptake, thus limiting the penetration of ink through this protective coating. Such a coating should also show good adhesion properties to the various surfaces present on a print head and its adhesion should not be degraded by exposure to ink.

SUMMARY

In one aspect, a UV curable coating composition is provided. The composition includes a (meth)acryloxy or vinyl functionalized silane, silica and an acrylate oligomer, wherein the acrylate oligomer contains at least two acrylate groups.

BRIEF DESCRIPTION OF THE DRAWINGS

The invention will be better understood with reference to the detailed description when considered in conjunction with the examples and the drawings, in which.

DETAILED DESCRIPTION

The coating compositions of the invention are based on a (methyl)acryloxy or vinyl functionalized silane (which will be referred to as functionalized silane in the following) which after hydrolysis of the hydrolyzable groups of the silane and curing, provides the basic matrix of the coating. In principle any suitable silane, alone or in combination with other silanes, can be used that has the formula (I)

(I), wherein in formula (I)

X denotes a hydrolysable group,

Y denotes a substituent that carries a vinyl, methacryloxy or acryloxy functionality;

$R^X$ is alkyl, aryl, alkenyl, alkylaryl or arylalkyl, a=1 to 3;

b=1 or 2.

Examples of a hydrolysable group are halogen atoms such as chloro or bromo atoms or —OR groups, i.e. alkoxy groups, aryloxy groups, alkylaryloxy groups or arylalkyloxy groups. Examples of groups that can be used as substituent Y are vinyl groups, acryloxyalkyl groups or methacryloxyalkyl groups.

One class of suitable (meth)acryloxy functionalized silanes has the chemical formula (II)

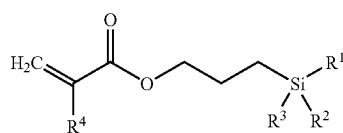

(II)

wherein in formula (II) $R^1$, $R^2$, and $R^3$ are independently from each other O-alkyl, O-aryl, O-arylalkyl, or halogen (Cl, Br, I, F) and $R^4$ is hydrogen or methyl. In this connection, it is noted that alkyl and aryl groups in the functionalised silane usually have 1 to 20 carbon atoms. Alkyl groups can be straight chained or branched. Examples of alkyl groups are methyl, ethyl, propyl, isopropyl, butyl, isobutyl, tertiary butyl, pentyl, isopentyl, neopentyl, hexyl, heptyl, octyl, nonyl groups and the like. Examples for aryl groups are phenyl, naphthyl. Examples for arylalkyl groups are toluoyl or xylyl, while benzyl is an example for an alkyl aryl group.

One class of suitable vinyl functionalized silane compounds has the chemical formula (III)

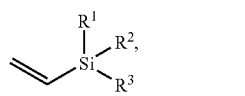

(III)

wherein in formula (III) $R^1$, $R^2$, and $R^3$ are independently from each other O-alkyl, O-aryl, O-arylalkyl, or halogen (Cl, Br, I, F), wherein alkyl and aryl are defined above with respect to the compounds of formula (II). Examples of particularly suitable alkyl groups are methyl, ethyl, propyl, and isopropyl, whereas phenyl is an example of a particularly suitable aryl group that can be present in the compounds of formula (II).

Figure 1A:
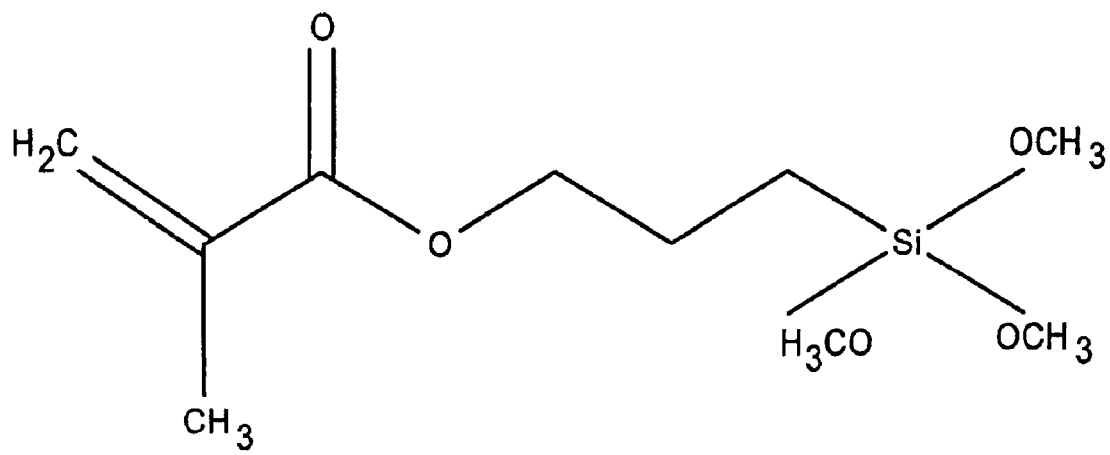
FIG. 1 shows 3-methacryloxypropyl trimethoxysilane (FIG. 1a) and 3-acryloxypropyl trimethoxysilane (FIG. 1b) and vinyl triethoxysilane (FIG. 1c) as examples of suitable functionalized silanes that can be used in the coating composition in accordance with an embodiment of the invention.
Figure 1B:
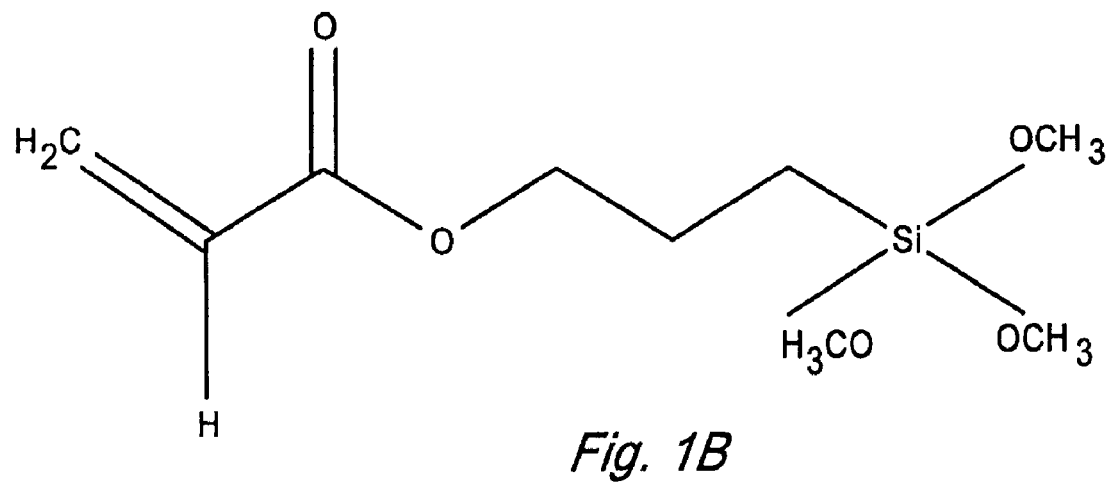
Figure 1C:
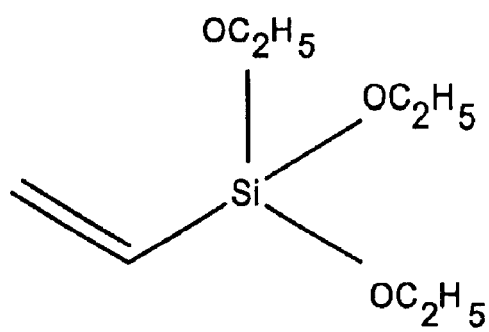

Examples of functionalized silane compounds that can be used in the coating composition of the invention are 3-methacryloxypropyl trimethoxysilane (cf. FIG. 1a), 3-acryloxypropyl trimethoxysilane (cf. FIG. 1b), 3-methacryloxypropyl triethoxysilane, 3-acryloxypropyl triethoxysilane, 3-methacryloxypropyl tritert-butyloxysilane, 3-acryloxypropyl tritert-butyloxysilane, 3-methacryloxypropyl dimethoxethoxysilane, 3-acryloxypropyl-dimethoxethoxysilane, 3-methacryloxypropyldiethoxmethoxysilane, 3-acryloxypropyldiethoxmethoxysilane, vinyl triethoxysilane (cf. FIG. 1c), vinyl trimethoxysilane, or vinyl tris(2-methoxyethoxy)silane.

Silica is a second component in the curable composition of an embodiment. Incorporation of silica into the curable composition allows the deposition of thicker coating layers that do not crack, i.e. that have a better mechanical strength. Any kind of silica particles can be used, as long as these particles are compatible with the process of producing the curable composition and with its deposition and curing on the selected substrate. Examples of suitable silica particles are fumed silica or colloidal silica. The silica particles can have a size ranging from 5 to about 200 or up to about 500 nanometers. Colloidal silica (Chemical Abstracts Number 7631-86-9) has been found to be particularly useful and is commercially available from many suppliers. For example, it is sold under the trade name Snowtex® from Nissan Chemicals or under the trade name NYACOL® from Nyacol Nanotechnologies, Inc. The silica used may have any available particle size and form. Typically, the particles of the used silica have an average particle size or particle size distribution ranging from about 5 to about 100 nanometers. In one embodiment, the silica particles have a particle size in the range of from about 10 to about 20 nanometers.

The curable composition further includes an acrylate oligomer. Addition of such an oligomer was found to improve the resistance of the cured coating to degradation by ink. The acrylate oligomer contains at least two acrylate groups (which are also referred to as functionalities). The acrylate oligomer may thus have any number of acrylate functionalities from two or more, as long as the acrylate oligomer is compatible with the other components of the coating composition and leads to a coating with acceptable chemical and mechanical properties.

Typically, the acrylate oligomer has two to six acrylate functionalities, meaning that the acrylate oligomer contains, for example, two, three, four or six acrylate groups that can be cross-linked when curing the coating composition disclosed herein. The acrylate oligomer can be any aliphatic or aromatic branched or straight-chained acrylate product. The oligomer can be an individual oligomer of a defined molecular weight, or an oligomer having a molecular weight distribution. It can be made from each a single building block or monomer for the isocyanate component (which can be tolylenediisocyanate or hexamethylendiisocyanate, for example) and the component having active hydroxyl groups (for instance 1,4 butyleneglycol, or a polyether based on 1,2-ethyleneglycol). A mixture of different building blocks for each of the isocyanate component and the component having hydroxyl group can also be present in the acrylate oligomer. Mixtures of two or more chemically different acrylate oligomers can also be used in the composition.

Examples of suitable acrylate oligomers are urethane (meth)acrylate oligomer, epoxy (meth)acrylate oligomer, polyester (meth)acrylate oligomer, polybutadiene (meth)acrylate oligomer or melamine acrylate oligomer. Such an acrylate oligomer can be used alone or in combination with any other suitable acrylate oligomer. The acrylate oligomer can be chosen empirically such that chemical resistance, water resistance and heat resistance of the resulting coating are improved.

In accordance with the above explanations, useful acrylate oligomers can include a polyester backbone, a polyether backbone or a combination thereof. A useful class of acrylate oligomers are urethane acrylate oligomers. Examples of such urethane acrylates that can be used in the present invention are those oligomers from Sartomer Company, Inc, Exton, Pa. that are available under the CN-Series or the Riacryl materials, for example, Sartomer CN 991, CN 980, CN981, CN962, CN 964, Sartomer CN973J85 or Sartomer Riacryl 3801 etc. For example, CN 981 and CN 980 are aliphatic linear ethers, with a weight average molecular weight of about 1600 to about 1800 and about 2400 to about 2600, respectively. CN 964 is a branched ester with a weight average molecular weight of 1600 to 1800.

Other examples of suitable urethane acrylate oligomers are the linear polyether urethane (meth)acrylate oligomers of the BR-500 series or aliphatic (difunctional) polyester urethane acrylate oligomers of the BR-700 series, or the aromatic and aliphatic trifunctional polyether urethane (meth)acrylate oligomers of the BR-100 series all of which are available from Bomar Specialties Co., Winsted, Conn. The general class of urethane oligomers described in U.S. Pat. No. 5,578,693 can also be used in the composition of the invention.

Other examples of suitable acrylate oligomers are the melamine acrylate oligomers of the BMA series which are also available from Bomar Specialties Co. An example of a suitable polyester acrylate oligomer is the oligomer CN294 available from Sartomer Company, Inc.

In one embodiment, an adequate acrylate oligomer has a weight average molecular weight in the range from about 1000 to about 6000 Dalton. In another embodiment, the acrylate oligomers have a weight ranging from about 1100-1300 to about 5400-5600.

A further component of the curable composition is a solvent. In principle, any solvent can be used as long as it is miscible with the other components but chemically inert. Examples of useful solvents include ethanol, isopropanol, ethyl methyl ketone (EMK) or high boiling points solvents such as ethylene glycol, propylene glycol, propylene glycol methyl ether, propylene glycol ethyl ether and other glycol ethers.

In addition to the above-mentioned components, the curable composition can optionally include an adhesion improving agent. Depending on the nature of the part to be coated, a single adhesion improving agent (also called adhesion promoting agent) or a combination of two or more of them can be used. Such an agent can be a mercapto functionalized alkoxysilane, an epoxy functionalized alkoxysilane or combinations thereof. Mercapto functionalized alkoxysilanes have been found useful in particular when surfaces that contain metals such as gold, copper, iridium, or palladium are to be coated since the sulfur group binds to these metals. In so doing, not only is the wet adhesion strength of the coating improved, but also the corrosion inhibition properties of the coating.

Epoxy functionalized silanes bind well to polymeric surfaces such as polyimide. Therefore, by use of epoxy functionalized silanes, the coating adhesion on polymeric surfaces can also be markedly improved. Thus, combinations of a mercapto functionalized silane and an epoxy functionalized silane are typically employed when the part to be coated with the composition in accordance with an embodiment has both metallic and polymeric surfaces present.

Examples of suitable mercapto functionalized alkoxysilanes are 3-mercaptopropyl trimethoxysilane or 3-mercaptooctyltrimethoxysilane. Examples of epoxy functionalized alkoxysilane are 3-glycidoxypropyl trimethoxysilane, 3-glycidoxypropyl trimethoxysilane, 3-glycidoxypropyl methyldiethoxysilane, or 3-glycidoxypropyl methyldimethoxysilane. If desired, these adhesion improving agents can be present in the composition in a range of about 0.5 to 20 wt. % related to the total weight of the composition. Typically, the weight percentage of the adhesion improving agent is then chosen such that the molar ratio of the (meth)acryloxy or vinyl functionalized silane to the adhesion improving agent(s) varies in the range of 1.00:(0.01-0.50).

The above-described components are usually present in the curable composition in the following weight ratios (which are expressed as weight percent relating to the total weight of the composition; % w/w):

(methyl)acryloxy or vinyl functionalized silane: 25 to 50 wt.-%,
silica: 10 to 25 wt.-%,
acrylate oligomer: 4 to 15 wt.-%
solvent: 20 to 40 wt.-%;
adhesion improving agent (additive): 0.5 to 20 wt.-%

In some embodiments, the content of the components in the composition is as follows:

(methyl)acryloxy or vinyl functionalized silane: 30 to 42 wt.-%, or 35 to 38 wt.-%,
silica: 13 to 21 wt.-%, or 16 to 18 wt.-%,
urethane acrylate oligomer: 4 to 15 wt.-%
solvent: 25 to 37 wt.-%, or 28 to 32 wt.-%;
adhesion improving agent (additive): 5 to 18 wt.-% or 6 to 14 wt.-%

Furthermore, for the curing step an initiator compound (catalyst) that starts the cross-linking between any of the vinyl, acrylate and methacrylate groups within the coating is usually added to the composition. Since curing can be conveniently carried out by exposure to UV light, photoinitiators that create free radicals upon irradiation with light of respective wavelength are a presently preferred group of catalysts. Examples of suitable photoinitators include the compounds manufactured by Ciba, Switzerland under the trade names Darocur® and Irgacure®. Such initiator compounds are usually added to the composition in small amounts, for example, 0.1 to 5 wt. % relative to the total weight of the composition.

The composition can further include auxiliary agents which provide for a faster curing and/or an improved cross-linking of the vinyl and (meth)acrylate groups within the coating. Examples of such auxiliary agents are monomeric compounds having two or more acrylate functionalities such as 1,4-butanediol dimethacrylate, trimethylolpropane triacrylate, pentaerythritol triacrylate, or ditrimethylolpropane tetracrylate. If added, these auxiliary reagents are generally present in small amounts, typically 0.1 to 10 wt. % related to the total weight of the composition.

Figure 2:
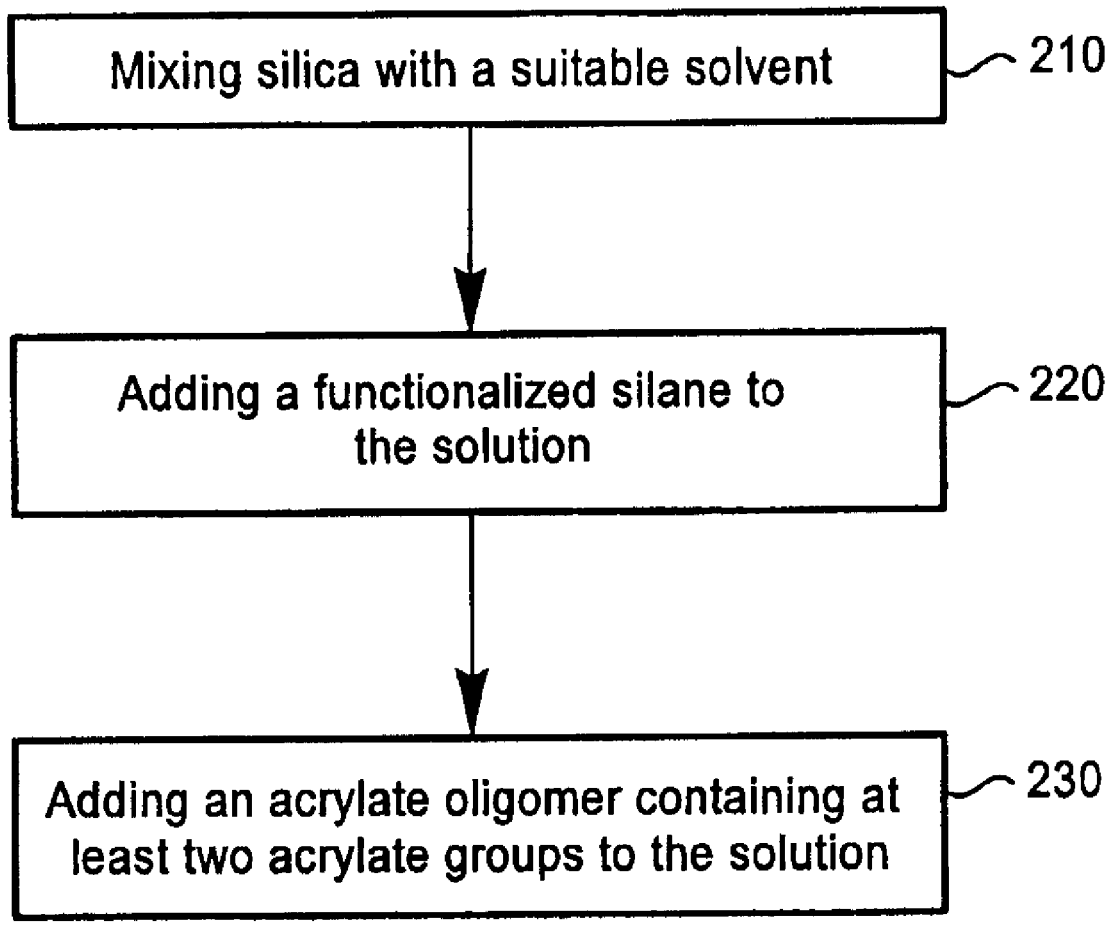
FIG. 2 shows a flow chart that illustrates a method of preparing a coating in accordance with an embodiment of the present invention.

FIG. 2 shows a method of preparing a composition in accordance with an embodiment. A first step 210 involves mixing silica with a solvent. In an embodiment, a colloidal silica such as Snowtex O (Nissan Chemicals is utilized and examples of a suitable solvent include ethanol, isopropanol or mixtures thereof.

A second step 220 involves adding a functionalized silane to the solution. Examples of suitable functionalized silanes include 3-methacryloxypropyl trimethoxysilane or 3-acryloxypropyl trimethoxysilane. Here, the functionalized silane is added over a period of time that is sufficiently long to prevent formation of cloudiness. Usually, the addition of the functionalized silane is carried out dropwise over a period of 10 to 20 minutes. If used in the composition of the invention, the adhesion improving agent(s) such as mercapto and/or epoxy functionalized alkoxysilane(s) (e.g., 3-mercaptopropyl trimethoxysilane 3-glycidoxypropyl trimethoxysilane) is/are usually added to the reaction medium at the same time. The solution is then allowed to react for an appropriate period of time (generally several hours, for example about 1.5 or 2 hours to about 4 hours). During this period siloxane oligomers containing mixtures of the three functional groups are generated in the solution. The molar ratio of the (meth)acryloxy or vinyl functionalized silane to the adhesion improving agent can be varied in the range of 1.00:(0.05-0.50).

If epoxy functionalized alkoxysilane is present (alone or in combination with mercapto functionalized alkoxysilane) for improving the adhesion properties, the molar ratio of the (meth)acryloxy or vinyl functionalized silane to epoxy functionalized alkoxysilane can be varied in the range 1.00:(0.10-0.50). If mercapto functionalized alkoxysilane is present (alone or in combination with epoxy functionalized alkoxysilane) the molar ratio of the (meth)acryloxy or vinyl functionalized silane to mercapto functionalized alkoxysilane is usually varied in the range 1.00:(0.01:0.20). If members of these two classes of adhesion promoting agent are used together, a presently preferred molar ratio of functionalized silane to epoxy functionalized alkoxysilane and mercapto functionalized alkoxysilane is about 1.00:(0.33):(0.05). During the subsequent coating step, these oligomers cross-link to form the coating matrix.

Figure 3:
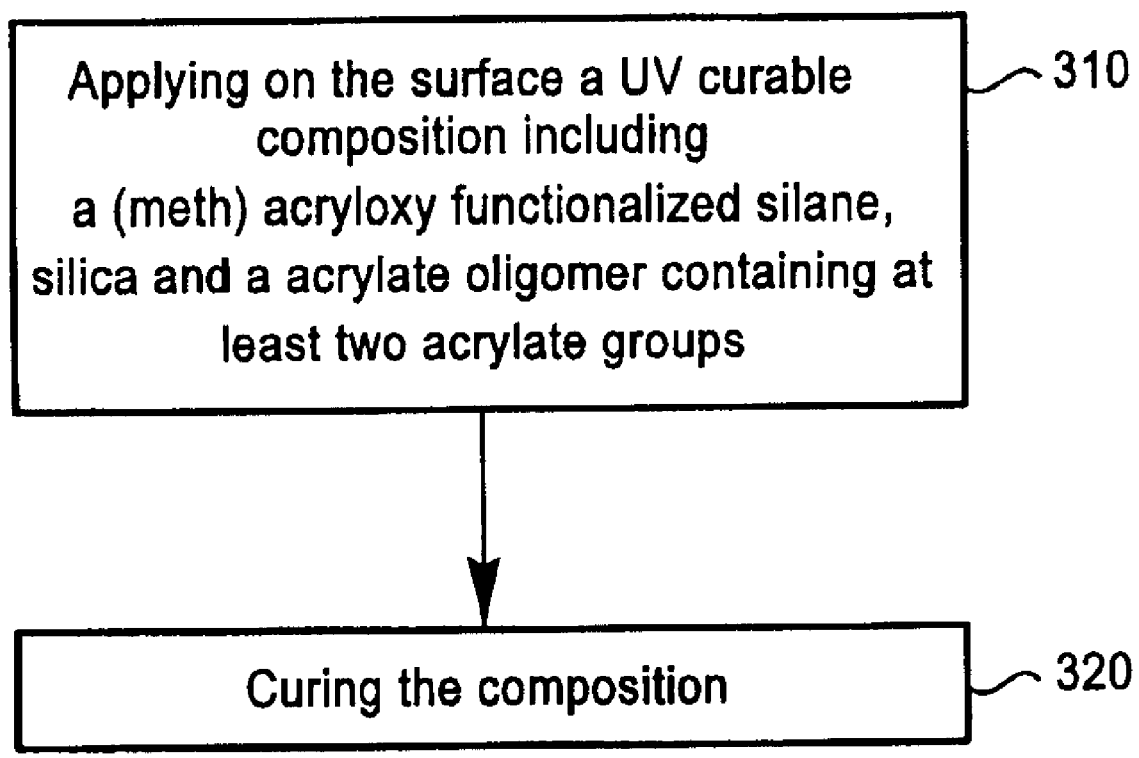
FIG. 3 shows a flow chart that illustrates a method of coating a selected surface in accordance with an embodiment of the present invention.

A final step 230 includes adding an acrylate oligomer containing at least two acrylate groups to the solution. In an embodiment, the acrylate oligomer is added in conjunction with a photoinitiator after the formation of the siloxane oligomers. The solution is then stirred to dissolve the acrylate oligomers An alternate embodiment is also contemplated whereby the so-obtained curable composition is applied on a selected surface. FIG. 3 shows a flowchart of a method of coating a selected surface. A first step 310 involves applying on a surface a UV curable composition containing a (meth)acryloxy functionalized silane, silica and a acrylate oligomer containing at least two acrylate groups. In an embodiment, the surface is a substrate. A final step 320 involves curing the applied composition.

Dip coating, micro-spray coating, spin coating as well as needle dispensing methods can been employed. Printing is also possible if the properties of the formulation are modified by addition of rheology modifiers. Suitable rheology modifiers are Aerosil fumed silicas, a range of which are supplied by Degussa AG, Düsseldorf, Germany. Spray coating and printing may provide advantages in some cases since they allow the coating composition (coating layer) to be applied selectively on specific areas of the surface where corrosion protection is required.

Coating thicknesses in the region of 1 to 20 microns are generally employed, though both thicker (for example up to 50 or 100 microns if traces at the interconnect region of a print head are to be protected by the coating) and thinner layers can be produced by adjustment of the coating solution properties or the parameters of the deposition technique.

After application, the coatings are UV cured in order to convert the surface to a tack free state. This step may be followed by a thermal consolidation step at a sufficiently high temperature (about 150° C. to about 200° C., for example) for a sufficiently long period of time, usually from several minutes to about one hour, to enhance the coating's mechanical properties and improve its chemical resistance. However, it is also possible to employ a longer curing time at a lower temperature. The actual conditions for the thermal curing also depend on processing constraints and curing equipment and can be determined empirically. UV irradiation causes cross-linking of the vinyl, acrylate and methacrylate groups within the coating, while thermal treatment accelerates formation of the sol-gel silicate matrix through condensation of residual silanol groups.

The coating composition shows good adhesion to a great variety of surfaces and thus allows the coating of a plurality of substrates. The substrate may include any material that is selected from the group consisting of silicon, metal, glass and polymeric material. If a polymeric material is to be coated, this polymeric material may include of polyimide, polycarbonate, poly(methyl)acrylate, acrylonitrile-butadiene-styrene (ABS), epoxide based polymers and combinations thereof. Metals that can be coated with the composition include gold, silver, palladium, iridium, platinum (i.e. the noble metals), copper, iron, nickel as well as alloys and any combination of such metals. The substrate can be, for example, part of any electronic component or circuitry, where a protective layer is usually applied to prevent mechanical damage, e.g., by abrasion, or chemical degradation, e.g., by corrosion.

As can be seen from the above list of suitable materials, the coating can be applied on virtually every material that is used in surfaces areas of ink jet print heads or cartridges of ink jet printers. Therefore, the coating composition can be applied to form a protective coating on interconnect regions or layers such as epoxy based barrier layers on ink jet printers, for example. The interconnect region may be the region of the interconnections between a die and a flexible circuit of the print head. A coating made from the composition may also be used as an undercoat prior to the application of a traditional encapsulant material used to protect the print head. Applied on the respective surfaces of an ink jet print head, the cured composition provides protection against ink ingress into the substrate and hence inhibits corrosion thereof.

Figure 4:
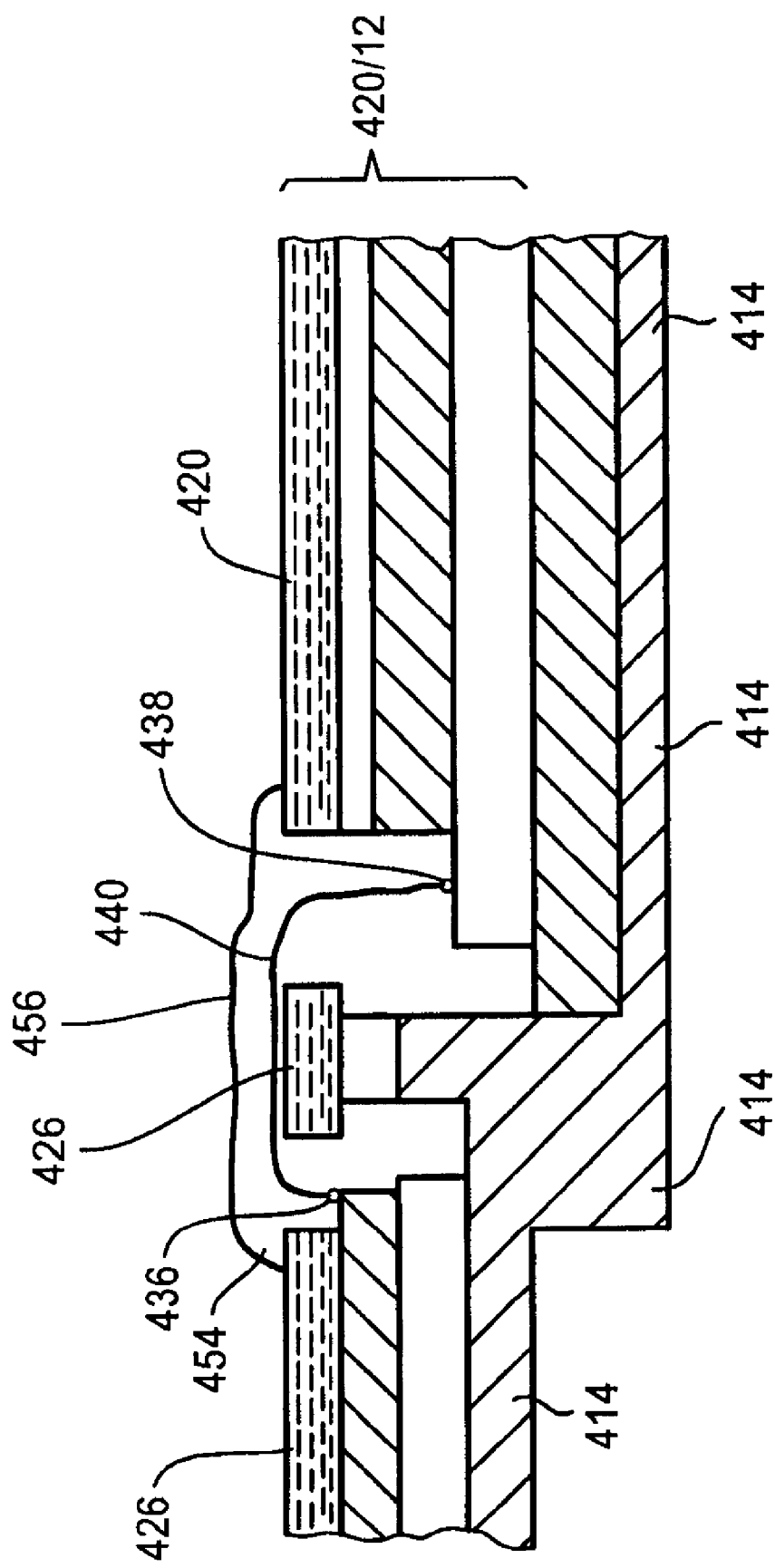
FIG. 4 shows a cross-sectional view of a portion of an ink jet cartridge (also known as ink jet pen) onto which a coating obtained from a curable coating composition in accordance with an embodiment of the invention is applied.

Therefore, in one embodiment the substrate to be coated is a print head on an ink jet cartridge. One example of a protective layer that is formed on parts of an ink jet cartridge using a composition is shown in FIG. 4. The cured coating composition provides a protective layer 454 in the interconnect region 456 of an ink jet cartridge (or pen). The interconnect region 456 is the region between the orifice plate 420 of an ink jet print head 412 and the tape automated bonding (TAB) circuit 426, both of which are attached to the cartridge body 414. The orifice plate 420 includes nickel and the TAB circuit 426 is made from a polyimide film. The protective layer 454 covers the bond pads 436, 438 and the wires or tape automated bonds (TAB) 440 and protects them from corrosion by ink which is expelled from nozzles (not shown) of the orifice plate 420. The coating composition is applied in such a manner that the protective coating is in contact with both the orifice plate 420 and the TAB circuit 426.

As will also be seen from the following examples, coatings of the invention show excellent adhesion to different surfaces present on the surface of ink jet print heads. The coatings are also not affected by accelerated aging tests. When immersed in ink at elevated temperature, coatings withstand up to 54 days exposure to ink at 60° C., thus making them very promising for use in large scale manufacture of ink jet print heads.

EXAMPLE 1

Snowtex O (9.0 g) was mixed with ethanol (11.0 g) in a glass beaker. To this mixture was added 3-methacryloxypropyl trimethoxysilane (19.8 g), 3-glycidoxypropyl trimethoxysilane (6.6 g) and 3-mercaptopropyl trimethoxysilane (0.8 g) dropwise with stirring. After allowing the hydrolysis and condensation reactions to proceed for 2 hours, Sartomer CN981 (6.8 g) was added and the solution was stirred until homogeneous. In the final step, Darocur 1173 photoinitiator (2 g) was added.

Using a dip coating process, with a sample retraction rate of 2 mm sec$^{-1}$, the coating solution was applied to tab head assemblies as well as to uncoated glass microscope slides and larger samples of materials present on only small surfaces of the ink jet print head (i.e. 25×25 mm area samples coated with epoxy formulations or plated with gold. Samples were UV cured by passage through a Technigraf GmbH (Grävenwiesbach, Germany) belt oven (80 W/cm, 3 m/min). Heating samples at 200° C. for two minutes completed the coating process.

Samples were stored in a sealed container filled with black ink at 60° C. At six day intervals, samples were removed from the ink, washed with deionized water and blotted dry. Adhesion of the coating to the different surfaces of interest was measured using cross hatch adhesion testing.

EXAMPLE 2

Snowtex O (9.0 g) was mixed with ethanol (11.0 g) in a glass beaker. To this mixture was added 3-methacryloxypropyl trimethoxysilane (19.8 g) and 3-mercaptopropyl trimethoxysilane (0.8 g) dropwise with stirring. After allowing the hydrolysis and condensation reactions to proceed for 2 hours, Sartomer CN981 (6.8 g) was added and the solution was stirred until homogeneous. In the final step, Darocur 1173 photoinitiator (2 g) was added.

EXAMPLE 3

Snowtex O (9.0 g) was mixed with ethanol (11.0 g) in a glass beaker. To this mixture was added 3-methacryloxypropyl trimethoxysilane (19.8 g) dropwise with stirring. After allowing the hydrolysis and condensation reactions to proceed for 2 hours, Sartomer CN981 (6.8 g) was added and the solution was stirred until homogeneous. In the final step, Darocur 1173 photoinitiator (2 g) was added.

EXAMPLE 4

Snowtex O (9.0 g) was mixed with ethanol (11.0 g) in a glass beaker. To this mixture was added 3-methacryloxypropyl trimethoxysilane (19.8 g) and 3-mercaptopropyl trimethoxysilane (0.8 g) dropwise with stirring. After allowing the hydrolysis and condensation reactions to proceed for 2 hours, Sartomer CN980 (6.8 g) was added and the solution was stirred until homogeneous. In the final step, Darocur 1173 photoinitiator (2 g) was added.

EXAMPLE 5

Snowtex O (9.0 g) was mixed with ethanol (11.0 g) in a glass beaker. To this mixture was added 3-methacryloxypropyl trimethoxysilane (19.8 g), 3-glycidooxypropyl trimethoxysilane (6.6 g) and 3-mercaptopropyl trimethoxysilane (0.8 g) dropwise with stirring. After allowing the hydrolysis and condensation reactions to proceed for 2 hours, Sartomer CN980 (6.8 g) was added and the solution was stirred until homogeneous. In the final step, Darocur 1173 photoinitiator (2 g) was added.

EXAMPLE 6

Snowtex O (9.0 g) was mixed with ethanol (11.0 g) in a glass beaker. To this mixture was added 3-methacryloxypropyl trimethoxysilane (18 g) and 3-mercaptopropyl trimethoxysilane (0.8 g) dropwise with stirring. After allowing the hydrolysis and condensation reactions to proceed for 2 hours, trimethylolpropane triacrylate (2g) and Sartomer CN981 (6.8 g) were added and the solution was stirred until homogeneous. In the final step, Darocur 1173 photoinitiator (2 g) was added.

EXAMPLE 7

Snowtex O (9.0 g) was mixed with ethanol (11.0 g) in a glass beaker. To this mixture was added 3-methacryloxypropyl trimethoxysilane (19.8 g) and 3-mercaptopropyl trimethoxysilane (0.8 g) dropwise with stirring. After allowing the hydrolysis and condensation reactions to proceed for 2 hours, Sartomer CN973J85 (6.8 g) was added and the solution was stirred until homogeneous. In the final step, Darocur 1173 photoinitiator (2 g) was added.

EXAMPLE 8

Snowtex O (9.0 g) was mixed with ethanol (11.0 g) in a glass beaker. To this mixture was added 3-methacryloxypropyl trimethoxysilane (19.8 g) and 3-mercaptopropyl trimethoxysilane (0.8 g) dropwise with stirring. After allowing the hydrolysis and condensation reactions to proceed for 2 hours, Sartomer CN973H95 (6.8 g) was added and the solution was stirred until homogeneous. In the final step, Darocur 1173 photoinitiator (2 g) was added.

EXAMPLE 9

Snowtex O (9.0 g) was mixed with ethanol (11.0 g) in a glass beaker. To this mixture was added 3-methacryloxypropyl trimethoxysilane (19.8 g), 3-glycidooxypropyl trimethoxysilane (6.6 g) and 3-mercaptopropyl trimethoxysilane (0.8 g) dropwise with stirring. After allowing the hydrolysis and condensation reactions to proceed for 6 hours, most of the solvent was evaporated off using a rotary evaporator and was replaced by methyl ethyl ketone. Sartomer Riacryl 3801 (6.8 g) was added and the solution was stirred until homogeneous. In the final step, Darocur 1173 photoinitiator (2 g) was added.

EXAMPLE 10 (COMPARATIVE EXAMPLE)

Snowtex O (9.0 g) was mixed with ethanol (11.0 g) in a glass beaker. To this mixture was added 3-methacryloxypropyl trimethoxysilane (19.8 g) dropwise with stirring. After allowing the hydrolysis and condensation reactions to proceed for 2 hours, Darocur 1173 photoinitiator (2 g) was added.

For examples 2 to 10, coatings were prepared and samples tested using the same procedures as outlined in Example 1.

RESULTS

Coating performance was measured by conducting adhesion tests after soaking parts in ink. A cross-hatch pattern approximately 2 cm×2 cm in size was cut in the coated substrate using a Stanley knife. Tape (Scotch 898, 3M) was then applied to the pattern and pulled off again in a slow controlled fashion, removing the tape at an angle of 90° to the substrate surface. A qualitative measure of coating adhesion was obtained by observing what percentage of the coating is removed on the tape.

This test was carried out on all the surfaces of interest in the interconnect region both before and after exposure of the samples to ink soak. Ink soak testing was carried out by placing coated substrates into a sealed bottle of ink, which was then stored in an oven at 60° C. for 6 days. The ink used was Hewlett Packard 51645a black ink. If coatings withstood the tape test after 6 days, samples were returned to the ink for further testing. Results of cross-hatch testing are shown in Table 1.

TABLE 1

| | Polyimide | | Gold | |
| --- | --- | --- | --- | --- |
| Example | coating removed after 6 days ink soak (%) | No. of days ink soak before >5% coating removed | coating removed after 6 days ink soak (%) | No. of days ink soak before >5% coating removed |
| 1 | 0 | 36-48 | 0 | >54 |
| 2 | 5-10 | 6-12 | 0 | >30 |
| 3 | 20-30 | 6 | 0 | 6 |
| 4 | 20-30 | 6 | 0 | >6 |
| 5 | 20-30 | 6 | 5-10 | 6 |
| 6 | 5-10 | 6 | 0 | >6 |

TABLE 1-continued

| | Polyimide | | Gold | |
| --- | --- | --- | --- | --- |
| Example | coating removed after 6 days ink soak (%) | No. of days ink soak before >5% coating removed | coating removed after 6 days ink soak (%) | No. of days ink soak before >5% coating removed |
| 7 | 5-10 | 6 | 0 | >6 |
| 8 | 5-10 | 6 | 0 | >6 |
| 9 | 0 | 36 | 0 | 24 |
| 10 (Comparative Example) | 100 | 6 | 100 | 6 |

As can be seen from Table 1, the composition results in coatings that show a good adhesion and resistance to long-term exposure of ink, whereas a coating that does not contain acrylate oligomers, is already completely removed after 6 days of testing under the same conditions, indicating an inferior adhesion.

The various modifications and alterations of this invention will be apparent to those skilled in the art without departing from the scope and spirit of this invention. The invention should not be restricted to that set forth herein for illustrative purposes.

What is claimed is:

1. A method for coating an inkjet print head with a protective layer comprising:
    applying on an inkjet print head a UV curable composition comprising: (a) 25% to 50% by weight (meth) acryloxy or vinyl functionalized silane, (b) 10% to 25% by weight silica, (c) 4% to 15% by weight acrylate oligomer containing at least two acrylate groups, and (d) 20% to 40% by weight solvent; and
    curing the composition.

2. The method of claim 1, wherein the coating provides protection in a region of interconnections between the inkjet print head and a flexible circuit.

3. The method of claim 1, wherein the coating composition is applied on the inkjet print head by a method selected from the group consisting of micro-spray application, dip coating, spin coating, printing and needle dispensing application.

4. The method of claim 1, wherein the (meth)acryloxy functionalized silane has a chemical formula

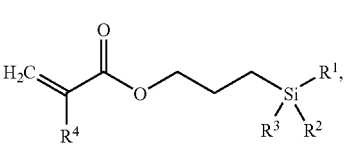

(I)

wherein in formula (I) $R^1$, $R^2$, and $R^3$ are independently from each other O-alkyl, O-aryl, O-arylalkyl, or halogen and $R^4$ is hydrogen or methyl, and wherein the vinyl functionalized silane has the chemical formula

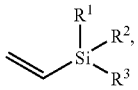

(II)

wherein in formula (II) $R^1$, $R^2$, and $R^3$ are independently from each other O-alkyl, O-aryl, O-arylalkyl, or halide.

5. The method of claim 1, wherein the silica is selected from the group consisting of colloidal silica and fumed silica.

6. The method of claim 5, wherein the colloidal silica has a particle size ranging from about 5 to 100 nanometers.

7. The method of claim 1, wherein the acrylate oligomer is selected from the group consisting of urethane (meth)acrylate oligomer, epoxy (meth)acrylate oligomer, polyester (meth)acrylate, polybutadiene (meth)acrylate oligomer, and melamine (meth)acrylate oligomer.

8. The method of claim 1, wherein the urethane acrylate oligomer comprises a backbone selected from the group consisting of a polyester backbone, polyether backbone or a combination thereof.

9. The method of claim 1, wherein the acrylate oligomer has a weight average molecular weight ranging from about 1000 to about 6000 Dalton.

10. The method of claim 1, further comprising an adhesion improving agent present in an amount of 0.5% to 20% by weight based on the total weight of the composition.

11. The method of claim 10, wherein the adhesion improving agent is selected from the group consisting of mercapto functionalized alkoxysilane, epoxy functionalized alkoxysilane or combinations thereof.

12. An inkjet print head comprising a coating layer obtained by curing a UV curable composition comprising
 a) 25% to 50% by weight (meth)acryloxy or vinyl functionalized silane
 b) 10% to 25% by weight silica
 c) 4% to 15% by weight acrylate oligomer containing at least two acrylate groups and
 d) 20 to 40% by weight solvent.

13. The inkjet print head of claim 12, wherein the (meth)acryloxy functionalized silane has a chemical formula

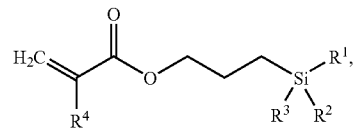

(I)

wherein in formula (I) $R^1$, $R^2$, and $R^3$ are independently from each other O-alkyl, O-aryl, O-arylalkyl, or halogen and $R^4$ is hydrogen or methyl, and wherein the vinyl functionalized silane has the chemical formula

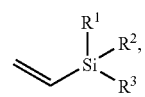

(II)

wherein in formula (II) $R^1$, $R^2$, and $R^3$ are independently from each other O-alkyl, O-aryl, O-arylalkyl, or halide.

* * * * *